(12) United States Patent
Hashimoto et al.

(10) Patent No.: US 8,307,408 B2
(45) Date of Patent: Nov. 6, 2012

(54) SYSTEM AND METHOD FOR FILE PROCESSING AND FILE PROCESSING PROGRAM

(75) Inventors: Hiromasa Hashimoto, Tokyo (JP); Tateki Harada, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 749 days.

(21) Appl. No.: 12/095,392

(22) PCT Filed: Jun. 15, 2007

(86) PCT No.: PCT/JP2007/062145
§ 371 (c)(1),
(2), (4) Date: May 29, 2008

(87) PCT Pub. No.: WO2008/152736
PCT Pub. Date: Dec. 18, 2008

(65) Prior Publication Data
US 2010/0185873 A1    Jul. 22, 2010

(51) Int. Cl.
*G06F 21/00* (2006.01)
(52) U.S. Cl. .......................................................... 726/3
(58) Field of Classification Search .................. 380/37
See application file for complete search history.

(56) References Cited

U.S. PATENT DOCUMENTS

| | | | |
|---|---|---|---|
| 4,907,275 A * | 3/1990 | Hashimoto | 713/161 |
| 5,584,023 A | 12/1996 | Hsu | |
| 7,448,086 B2 | 11/2008 | Sako et al. | |
| 2002/0019935 A1 | 2/2002 | Andrew et al. | |
| 2003/0088515 A1 | 5/2003 | Cooper et al. | |
| 2003/0208686 A1 | 11/2003 | Thummalapally et al. | |
| 2005/0262321 A1 * | 11/2005 | Iino | 711/164 |
| 2006/0184793 A1 | 8/2006 | Zizzi | |
| 2007/0061594 A1 * | 3/2007 | Ginter et al. | 713/189 |

FOREIGN PATENT DOCUMENTS

| | | |
|---|---|---|
| CN | 1767031 A | 5/2006 |
| CN | 1832398 A | 9/2006 |
| EP | 1 239 384 A2 | 9/2002 |
| EP | 1 333 438 A1 | 8/2003 |
| JP | 10-105470 A | 4/1998 |
| JP | 11-265317 | 9/1999 |
| JP | 2003-32248 A | 1/2003 |
| JP | 2003-330703 | 11/2003 |
| JP | 2005-165900 | 6/2005 |

* cited by examiner

*Primary Examiner* — Jeffrey Pwu
*Assistant Examiner* — Anthony Brown
(74) *Attorney, Agent, or Firm* — Mattingly & Malur, PC

(57) ABSTRACT

A cipher processing system for allowing file access while maintaining the integrity without a user being aware of the difference between files when the user accesses a file in a folder containing both a ciphertext file and a plaintext file. If a folder stores both a ciphertext file and a plaintext file, the ciphertext file is attached with identification information (preferably, footer information) indicating that the file is a ciphertext file, so that a plaintext file and a ciphertext file can be differentiated from each other when the files are read. A deciphered file gained by removing identification information from a ciphertext file and deciphering the file is delivered to an upper-level application. If the read file is a plaintext file, decipher processing is not executed on the plaintext file but the plaintext file is passed to the upper-level application program.

9 Claims, 8 Drawing Sheets

A

B

SYSTEM AND METHOD FOR FILE PROCESSING AND FILE PROCESSING PROGRAM

TECHNICAL FIELD

The present invention relates to a system and a method for file processing and a file processing program; for example, the present invention relates to a cipher processing system and the like that is suitable for accessing a file in a folder containing both a ciphertext file and a plaintext file.

BACKGROUND ART

In a cipher processing system, a ciphertext file storing confidential information, etc. and a plaintext file storing non-confidential, general information are typically managed by archiving them in different folders for easy management.

However, for example, it can be required to add a ciphertext file to a folder already containing a plaintext file. Then, the plaintext file and the ciphertext file cannot be distinguished from each other by their appearances since they have the identical extension and the like before and after ciphering if they are files created by the same application. In such a case, a plaintext file and a ciphertext file cannot be differentiated from each other, degrading convenience for a user (administrator of a file server). Additionally, as a result of the fact that a plaintext file and a ciphertext file cannot be differentiated from each other, file destruction may be caused by small carelessness such as executing a deciphering process on the plaintext file that is unnecessary for the file.

Consequently, if an identical folder contains both a ciphertext file and a plaintext file, a technique is needed for identifying both of the files and maintaining the file integrity. For example, Patent Document 1 discloses a policy to provide a label part to a header of a ciphertext file to differentiate the file from a plaintext file as a technique for permitting an identical folder to contain both a ciphertext file and a plaintext file.
Patent Document 1: JP Patent Publication (Kokai) No. 2005-165900

However, Patent Document 1 does not disclose a particular method of accessing the label part without a user or other application programs (AP) being conscious of the difference between a ciphertext file and a plaintext file. Moreover, it does not disclose a method of updating a ciphertext file while maintaining the file integrity when a user updates the file having a header provided with a label part.

In view of the above circumstances, the present invention provides a cipher processing system for allowing file access while maintaining the integrity without a user being conscious of the difference when the user accesses a file in a folder containing both a ciphertext file and a plaintext file.

DISCLOSURE OF THE INVENTION

To solve the above problem, if a folder stores both a ciphertext file and a plaintext file, the ciphertext file has attached identification information (preferably, footer information) indicating that the file is a ciphertext file, so that the plaintext file and the ciphertext file can be differentiated from each other when the files are read. A deciphered file gained by removing identification information from a ciphertext file and deciphering the file is delivered to an upper-level application.

That is, a file processing system according to the present invention is a file processing system for obtaining a file from a folder storing both a ciphertext file and a plaintext file and for delivering the file to an upper-level application program by using a computer executing the program, in which the ciphertext file being handled has attached identification information indicating that the relevant file is a ciphertext file. The file processing system is characterized by comprising: file read/write means for executing read or write of a file from/to the folder if the upper-level application program requests to read the file stored in the folder or requests to write the file; file distinguishing means for distinguishing whether the read file is a plaintext file or a ciphertext file based on whether or not the file contains the identification information; and file processing means for deciphering the ciphertext file and delivering a deciphered file produced by excluding the identification information from the read file to the upper-level application program if the read file is a ciphertext file. The identification information is preferably footer information attached after the body data in the ciphertext file. If the read file is a plaintext file, the file processing means does not execute decipher processing on the plaintext file but passes the plaintext file to the upper-level application program.

If the request to read the file is a request to read data by a pre-determined size from an intermediate position in the ciphertext file to the footer information, then the file processing means embeds insignificant information (NULL) in a part of the identification information, deciphers the read file, removes the insignificant information (NULL) and delivers the file to the upper-level application program.

The file processing system according to the present invention further comprises authentication means for executing authentication processing before the deciphering if the read file is the ciphertext file, in which if the authentication is successful, the file processing means deciphers the ciphertext file and delivers the deciphered file to the upper-level application program.

The present invention also considers an attaching position of footer information when a file which has been once read is updated through addition or removal of data. That is, in that case, the file processing means encrypts data after an upper-level application program edits a file and modifies an attaching position of footer information to cipher data according to the increase/decrease in the file size after the edit to generate an updated ciphertext file and the file read/write means writes the updated ciphertext file in a folder.

Further characteristics of the present invention will be apparent from the best mode for carrying out the present invention and the attached drawings.

According to the present invention, in a folder containing both a ciphertext file and a plaintext file, footer information is attached to the ciphertext file so that the both can be identified. Further, footer information is hidden when the files are delivered to a user so that the files can be accessed while maintaining the integrity without the user being conscious of the information.

DESCRIPTION OF SYMBOLS

Figure 1:
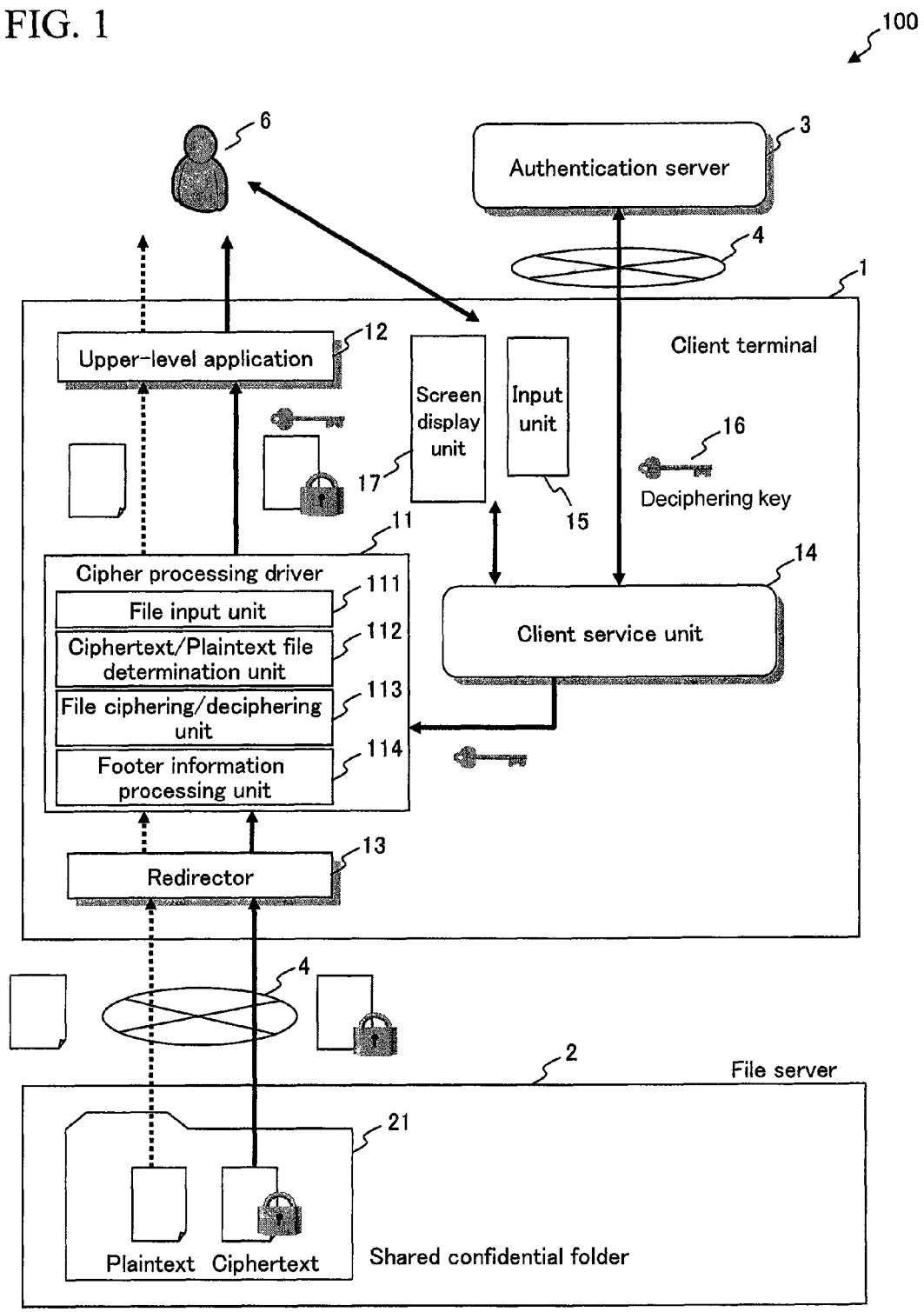
FIG. 1 is a system configuration diagram showing one embodiment of the present invention.

1 . . . client terminal
2 . . . file server
3 . . . authentication server
4 . . . network
6 . . . user
11 . . . cipher processing driver
12 . . . upper-level application
22 . . . plaintext file
23 . . . ciphertext file
25 . . . cipher data
26 . . . footer
100 . . . cipher processing system (file processing system)

BEST MODE FOR CARRYING OUT THE INVENTION

The following will describe an embodiment of the present invention in detail with reference to the attached drawings. The embodiment of the present invention is just one example to realize the present invention and does not limit the present invention, but can be modified or/and improved without departing from the essence of the present invention.

<Configuration of Cipher Processing System>

FIG. 1 is a block diagram showing the overall configuration of a cipher processing system (file processing system) according to the embodiment of the present invention. In FIG. 1, a cipher processing system 100 comprises a client terminal 1 for ciphering/deciphering, for example, a ciphertext file, a file server 2 for saving a ciphertext file/plaintext file and the like and an authentication server 3 for authenticating a user for access to a ciphertext file, which are connected with one another via a network 4.

The client terminal 1 comprises a cipher processing driver 11 for controlling a ciphertext file and a plaintext file, an upper-level application 12 which is started up by a user 6 or others, a redirector 13 for retrieving and reading a designated file from the file server 2 on the network, a client service unit 14 for controlling user authentication, an input unit 15 through which the user 6 or others input a direction and a screen display unit 17 for displaying such as application output. The cipher processing driver 11 comprises a file input unit 111, a ciphertext/plaintext file determination unit 112, a file ciphering/deciphering unit 113 and a footer information processing unit 114.

The file server 2 has a shared confidential folder 21 which contains both a plaintext file 22 and a ciphertext file 23.

The authentication server 3 authenticates the client service unit 14 when the user 6 accesses the ciphertext file 23. If the authentication is successful, the server 3 issues a deciphering key 16.

<Outline of File Access Processing>

Next, a procedure will be described for the user 6 to access a file stored in the shared confidential folder 21 on the network.

When the user 6 requests to access a file such as via the screen display unit 17 and the input unit 15 of the client terminal 1, the client service unit 14 conveys the access request to the cipher processing driver 11, which further conveys the access request to the redirector 13.

The redirector 13, which has received the file access request, retrieves the file server 2 on the network, reads the relevant file stored in the shared confidential folder 21 into the client terminal 1 and delivers the file to the cipher processing driver 11. The access request by the user can be for a ciphertext file or a plaintext file. The redirector 13 delivers the file to the cipher processing driver 11 in a format read from the shared confidential folder 21 without being conscious of whether the request is for a ciphertext file or a plaintext file.

The cipher processing driver 11, which has received the file through the file input unit 111, determines by the ciphertext/plaintext file determination unit 112 whether the target file is the plaintext file 22 or the ciphertext file 23. Specifically, the ciphertext/plaintext file determination unit 112 distinguishes whether or not the file to be accessed contains identification information (footer information) indicating being a ciphertext file. If the file does not contain the information, the unit 112 judges the file to be a plaintext file; if the file contains the information, the unit 112 judges the file to be a ciphertext file. The footer information accounts for a pre-determined size from the end of the target file. The footer information processing unit 114 separates the footer information from the target file. The ciphertext/plaintext determination unit 112 searches for an eye catcher (a specific character string meaning that a target file is a ciphertext file) and obtains a deciphering key, as described later (see FIG. 3). In this processing, the separated footer information is temporarily stored in a memory (not shown) for when the target ciphertext file will be written (updated).

If the target file is judged to be a plaintext file, the cipher processing driver 11 directly delivers the file to the upper-level application 12. Otherwise, if the target file is judged to be a ciphertext file, the cipher processing driver 11 requests the user 6 to input a password or the like for user authentication via the client service unit 14. The client service unit 14 which has received a password or the like inputted through the input unit 15 inquires of the authentication server 3 to request for authentication. If the authentication is OK, the unit 15 obtains the deciphering key 16 and passes it to the cipher processing driver 11.

The file ciphering/deciphering unit 113 of the cipher processing driver 11 which has received the deciphering key 16 compares a deciphering key obtained from the footer information and the deciphering key 16. If the comparison satisfies a pre-determined condition, the unit 113 deciphers the target file. After deciphering the file, the file ciphering/deciphering unit performs processing such as to hide footer information (described later) and then delivers the file to the upper-level application 12. Processing from the target file distinguishing to the file delivering (FIG. 3), footer information hide processing (FIGS. 5 and 6), and EOF position modification processing (FIGS. 7 and 8) will be described later.

<File Configuration>

Figure 2:
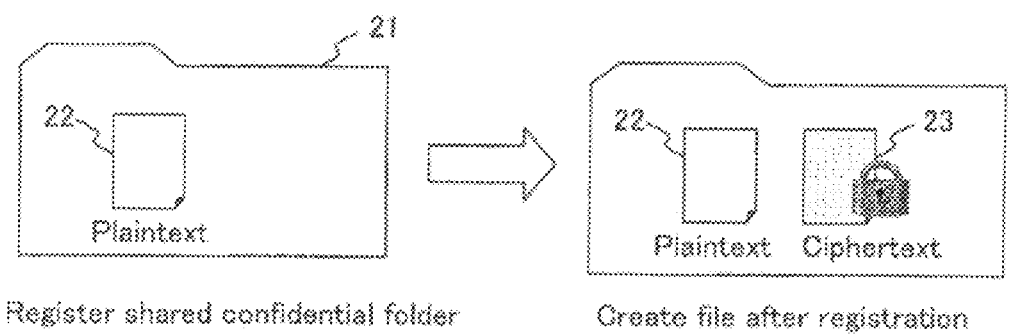
FIGS. 2A-2B are diagrams showing the configuration of a plaintext file and a ciphertext file in the present invention.
Figure 2:
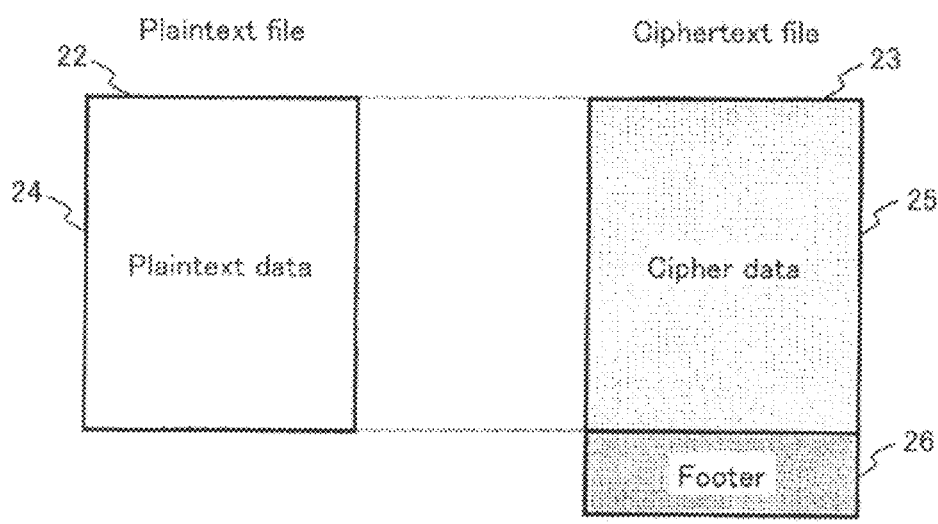

FIG. 2A is a diagram showing one example of a process in which the shared confidential folder 21 contains both the plaintext file 22 and the ciphertext file 23.

First, assume that when the shared confidential folder 21 is first registered, the plaintext file 22 has been already contained in it. If the system in the example in the figure permits only a ciphertext file for new registration of a file, a file added to the shared confidential folder 21 is the ciphertext file 23 only. The shared confidential folder 21 contains both a plaintext file and a ciphertext file since the plaintext file 22 has been already contained in the folder.

FIG. 2B is a diagram showing configuration of a plaintext file and a ciphertext file in the present invention. The shared confidential folder 21 contains both the plaintext file 22 and the ciphertext file 23. It is determined whether or not a file in the shared confidential folder 21 has been ciphered by seeing footer information attached to the end of a file. That is, the plaintext file 22 consists of only the plaintext data body 24 with footer information being disguised 27, while the ciphertext file 23 contains the cipher data body 25 and footer information 26 being attached by a footer information attaching unit 114 of the cipher processing driver 11 so that the file 23 is larger than the file 22 in file size by the footer information 26.

For a data format of the footer information 26, the other parts can be in any format if the information contains an eye catcher that can be clearly differentiated from the cipher data body 25 and identified. Although footer information is illustrated as the identification information, it is not limited to the footer information but can be arranged in a header part or an intermediate part of a file. However, identification information is arranged in a footer so that implementation is easy on the OS. That is, if the identification information is in a header part, a position of the data must be offset for management, making the implementation difficult.

<File Type Distinguishing and File Presentation Processing>

Figure 3:
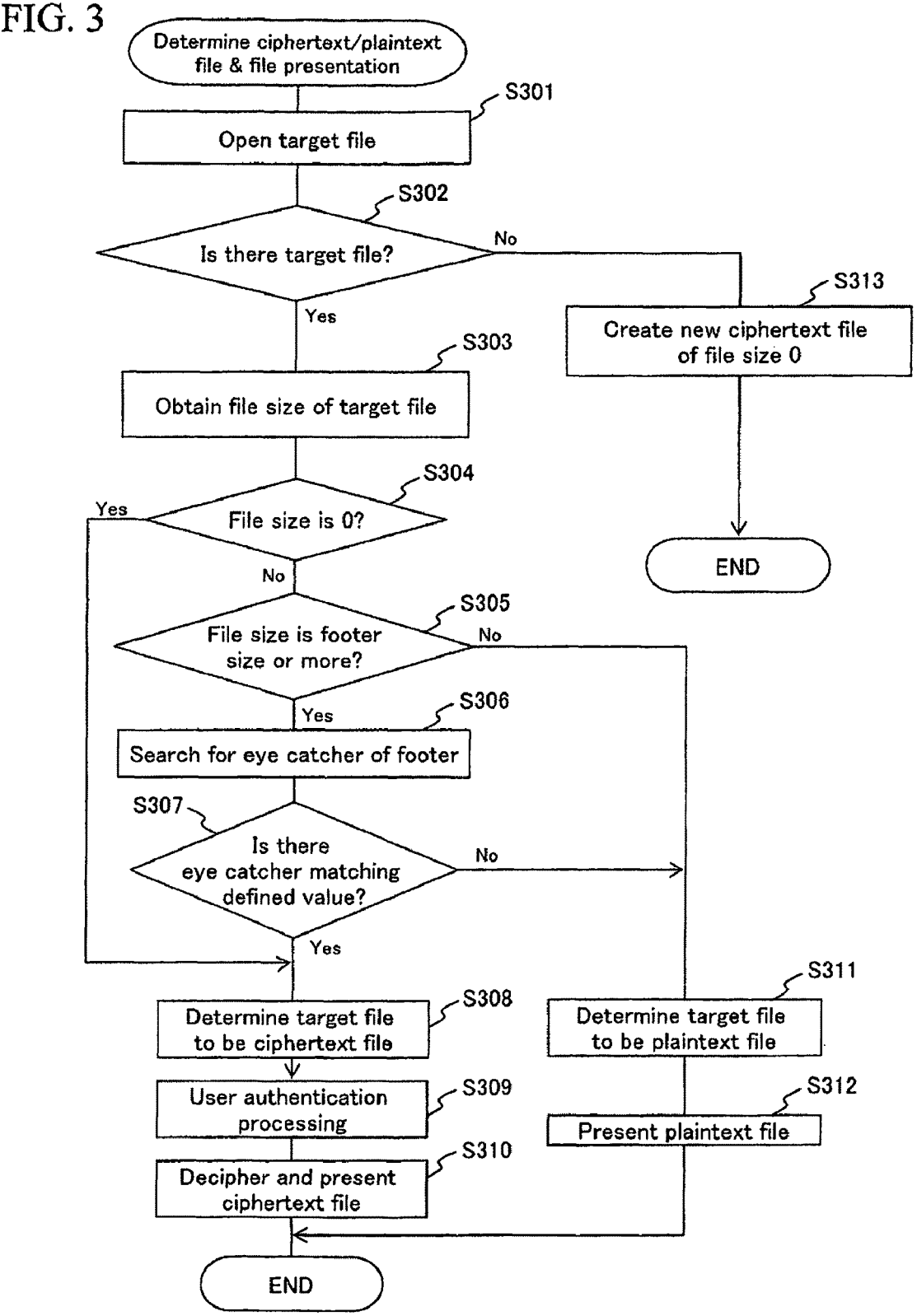
FIG. 3 is a flowchart illustrating processing to distinguish a ciphertext file and a plaintext file.

Next, processing will be described for the ciphertext/plaintext file determination unit 112 (hereinafter, "file determination unit 112") of the cipher processing driver 11 to check the footer information to distinguish whether it is a ciphertext file or a plaintext file and finally deliver the file to an upper-level application. FIG. 3 is a flowchart illustrating processing to distinguish whether a file is a ciphertext file or a plaintext file and present the file to a user (deliver to an upper-level application).

First, according to a direction by the user 6, for example, the upper-level application 12 generates a file open instruction, in response to which the file determination unit 112 opens a target file to be accessed (S301). Since an accessed target may include a new file, the file determination unit 112 determines whether or not there is the target file (S302). If there is not the target file, the file determination unit 112 creates a new ciphertext file of file size 0 (zero) and finishes the processing (S313). Otherwise, if there is the target file, then the file determination unit 112 obtains the file size of the target file (S303). If the file size is 0 (S304), the unit 112 determines the target file is a ciphertext file (S308).

If it is judged at step S304 that the file size is positive, the file determination unit 112 determines whether the file size is not less than the footer size (S305). If the file size is less than the footer size, then apparently the target file does not contain footer information, so that the unit 112 determines that the target file is a plaintext file (S311). Then, the file determination unit 112 directly delivers the plaintext file to the upper-level application (S312). If it is judged at step S305 that the file size is not less than the footer size, then the file determination unit 112 searches for an eye catcher (specific identification information) contained in the footer information and compares the eye catcher and a defined value of the ciphertext file to judge whether or not they match each other (S307). If the both do not match each other, the processing proceeds to step S311 where the target file is processed as a plaintext file.

If it is judged at step S304 that the file size is 0 (zero), or it is judged at step S307 that the eye catcher and the defined value of the ciphertext file match each other, then the processing proceeds to step S308 and the file determination unit 112 distinguishes the target file to be a ciphertext file (an empty ciphertext file if the file size is 0). Simultaneously, a deciphering key for the ciphertext file is obtained from the footer information. Then, the user authentication processing is executed between the user 6 and the authentication server 3 (S309). If the authentication is successful, the authentication server 3 issues the deciphering key 16 and hands over the key to the client service unit 14. The client service unit 14 further hands over the deciphering key 16 to the file ciphering/deciphering unit 113. The file ciphering/deciphering unit 113 compares the deciphering key 16 from the client service unit 14 and the deciphering key obtained from the footer information. If the keys match each other, the unit 113 judges that the target ciphertext file can be deciphered, deciphers the file and delivers the deciphered file to the upper-level application 12 (S310).

Although a new file is always created as a ciphertext file in the above, an option is also possible to create a new plaintext file.

In the above manner, the processing is completed to distinguish a ciphertext/plaintext file and deliver a deciphered file.

<Outline of Processing to Access Ciphertext File>

Figure 4:
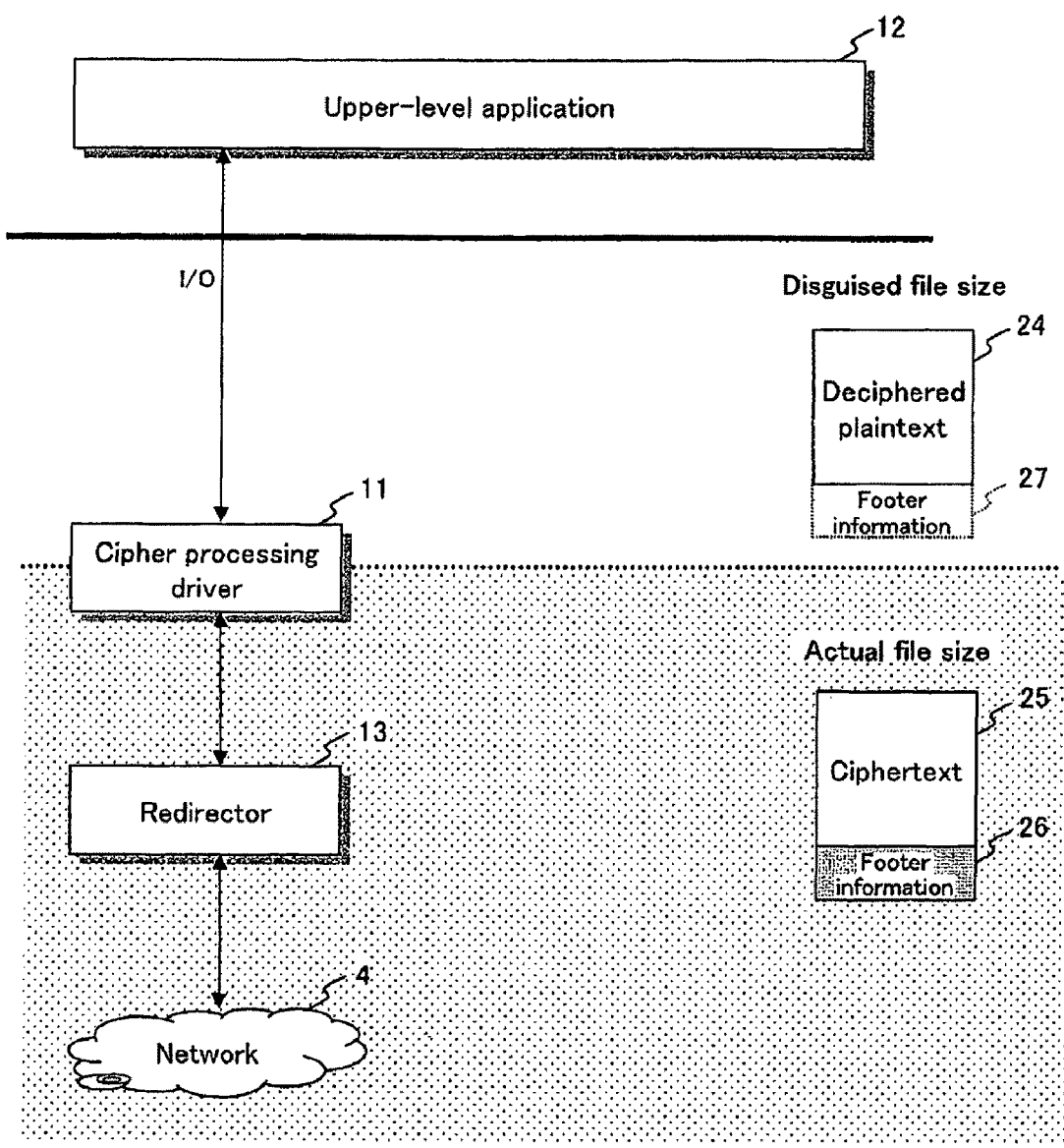
FIG. 4 is a diagram showing an outline of processing by an upper-level application to access a ciphertext file via a cipher processing driver.

FIG. 4 is a diagram showing an outline of processing by the upper-level application 12 to access the ciphertext file 23 via the cipher processing driver 11. As already described, the ciphertext file 23 contains the footer information 26 being attached to the end of the file in addition to the encrypted data body 25. It is desired that a user does not recognize the footer information 26 if the ciphertext file 23 is deciphered. This is in order not to leak important information for security such as a deciphering key contained in the footer information. For this purpose, the ciphertext file deciphering unit 113 of the cipher processing driver 11 disguises the file size to hide the footer information 26. Further, though the end of the file (EOF) is physically the end of the footer information, the EOF shown to a user is controlled to be, in a pseudo manner, the end of the data body 25, as described later (see FIG. 6).

<Processing to Hide Footer Information>

Figure 5:
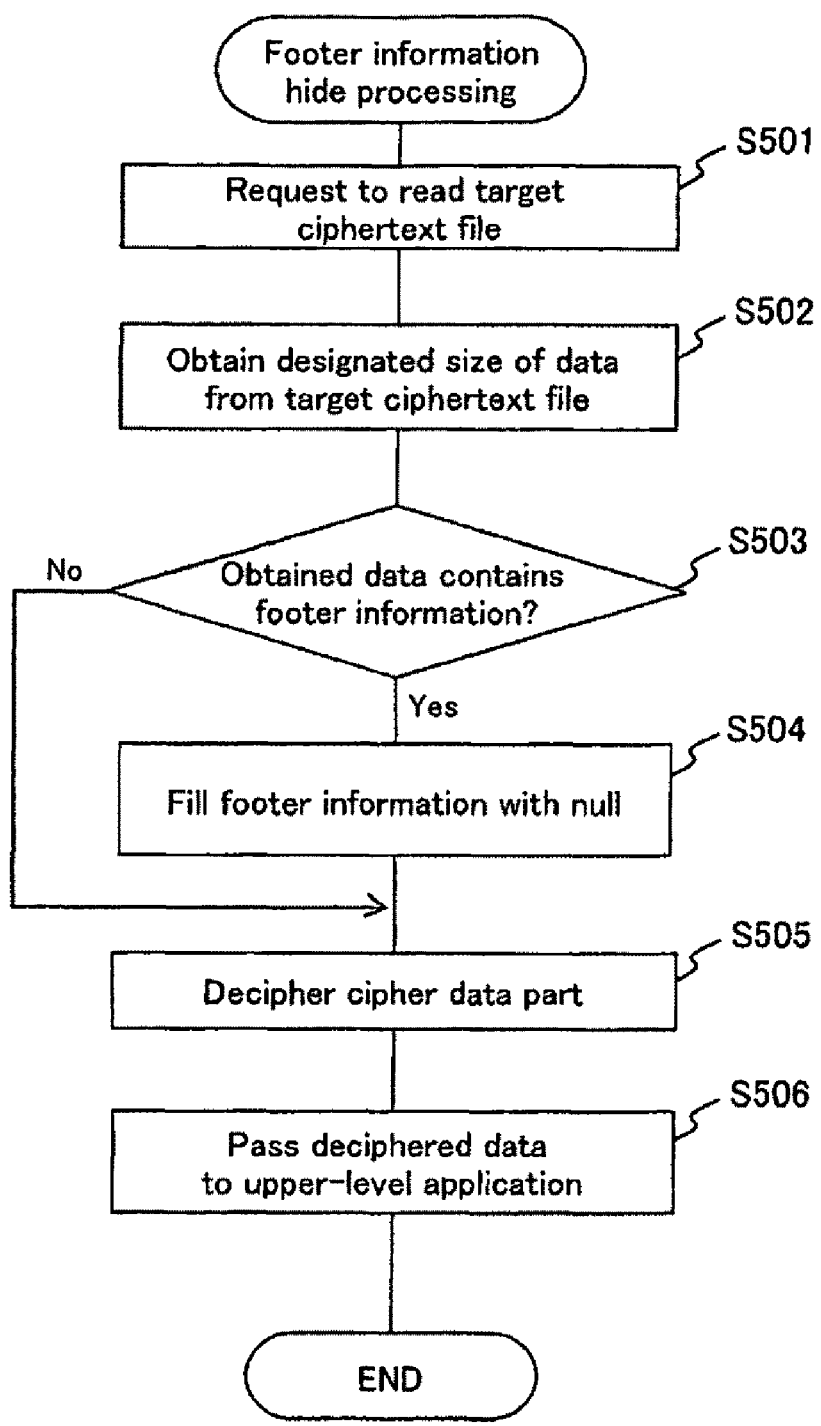
FIG. 5 is a flowchart illustrating footer information hide processing.
Figure 6:
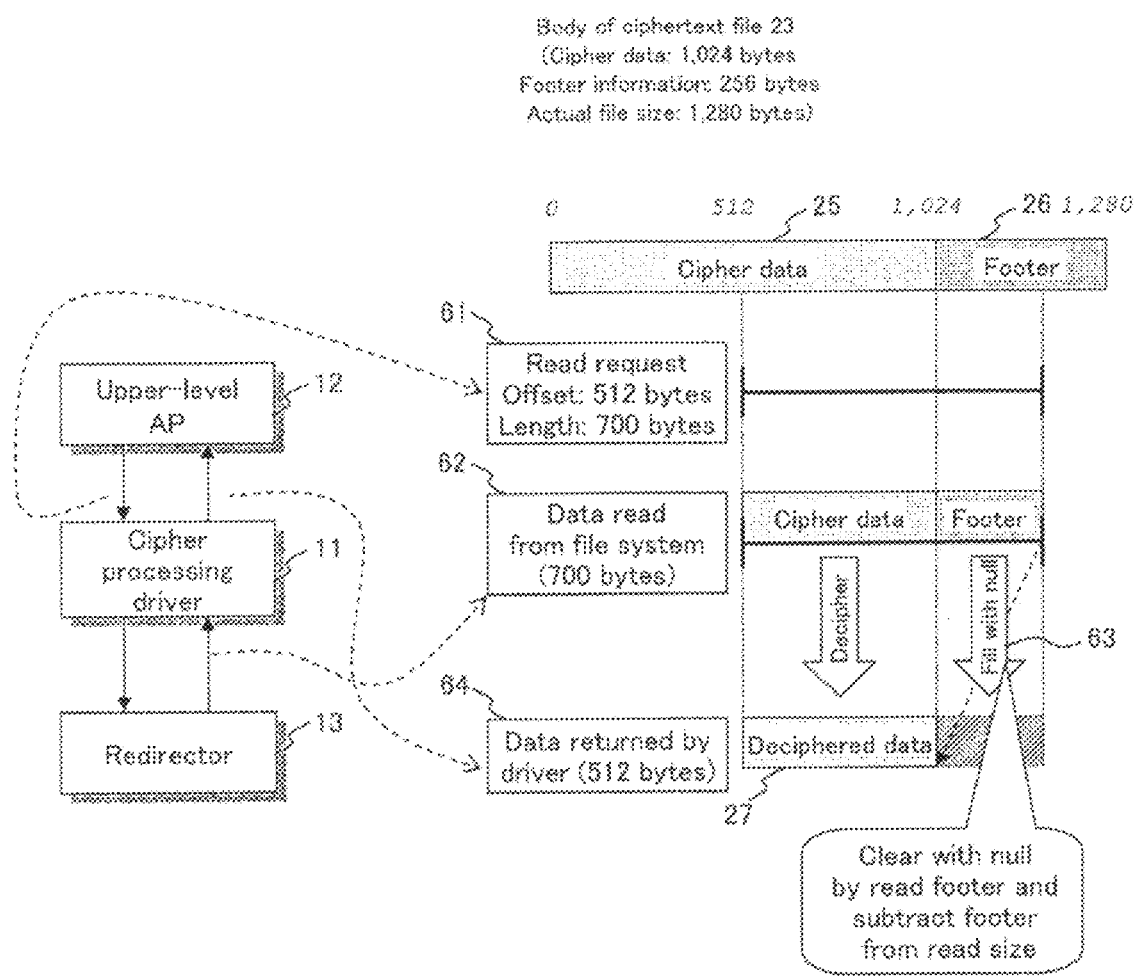
FIG. 6 is a diagram showing a particular method of hiding footer information.

FIG. 5 is a flowchart illustrating processing to hide footer information by the file ciphering/deciphering unit 113. FIG. 6 is a diagram illustrating a particular method of the hide processing.

The cipher processing driver 11 disguises a file size so that an upper-level application is not conscious of the footer information 26. However, a normal application often reads beyond the file size. Not only may an application intentionally read beyond the file size, but also paging READ to cache data may cause reading beyond the file size. During that, read data might contain footer information and the information might be presented accidentally. To prevent this, the footer information hide processing as in FIG. 5 is executed.

In FIG. 5, first, a request by the user 6 is obtained to read a target ciphertext file (S501). For example, in the example in FIG. 6, consider that the user 6 requests, through the upper-level application 12, to read 1280-byte ciphertext file 23 in the actual file size containing 1024-byte-long cipher data 25 and 256-byte-long footer information 26 by 700-byte length from the 512th byte (an offset position) of the cipher data (see 61 in FIG. 6).

Then, the file ciphering/deciphering unit 113 obtains a size of data designated by the user in a target file to be ciphered (S502). In FIG. 6, the unit 113 obtains 700-byte data from the 512th byte (see 62 in FIG. 6). In that case, the redirector 13 returns the 700-byte data read from a file system on the network to the cipher processing driver 11.

Subsequently, the file ciphering/deciphering unit 113 judges whether or not the obtained data contains footer information (S503). If it is judged that the obtained cipher data contains footer information, a footer information processing unit fills the footer information part in the obtained cipher data with NULL (information that has no meaning: insignificant information) (S504). Then, the file ciphering/deciphering unit 113 deciphers only the ciphered data part (S505). If it is judged at step S503 that footer information is not contained, only the obtained ciphertext part is deciphered (S505). Then, the file ciphering/deciphering unit delivers the deciphered data to the upper-level application (S506). Describing with reference to the particular example in FIG. 6, the cipher data body is 512 bytes, and hence the other 188 bytes should contain the footer information. In that case, the ciphertext file deciphering unit 113 of the cipher processing driver 11 deciphers the 512-byte cipher data, clears the 188-byte footer information with NULL (see 63 in FIG. 6), and returns 512 bytes as the file size by subtracting the 188-byte footer information from the read 700-byte data to the upper-level application to hide the footer information (see 64 in FIG. 6).

Although footer information contained in the obtained cipher data is filled with NULL in the above, it does not have to be filled with NULL. Instead, the footer information processing unit can perform processing to remove a corresponding footer information part.

<Processing to Update Ciphertext File>

Figure 7:
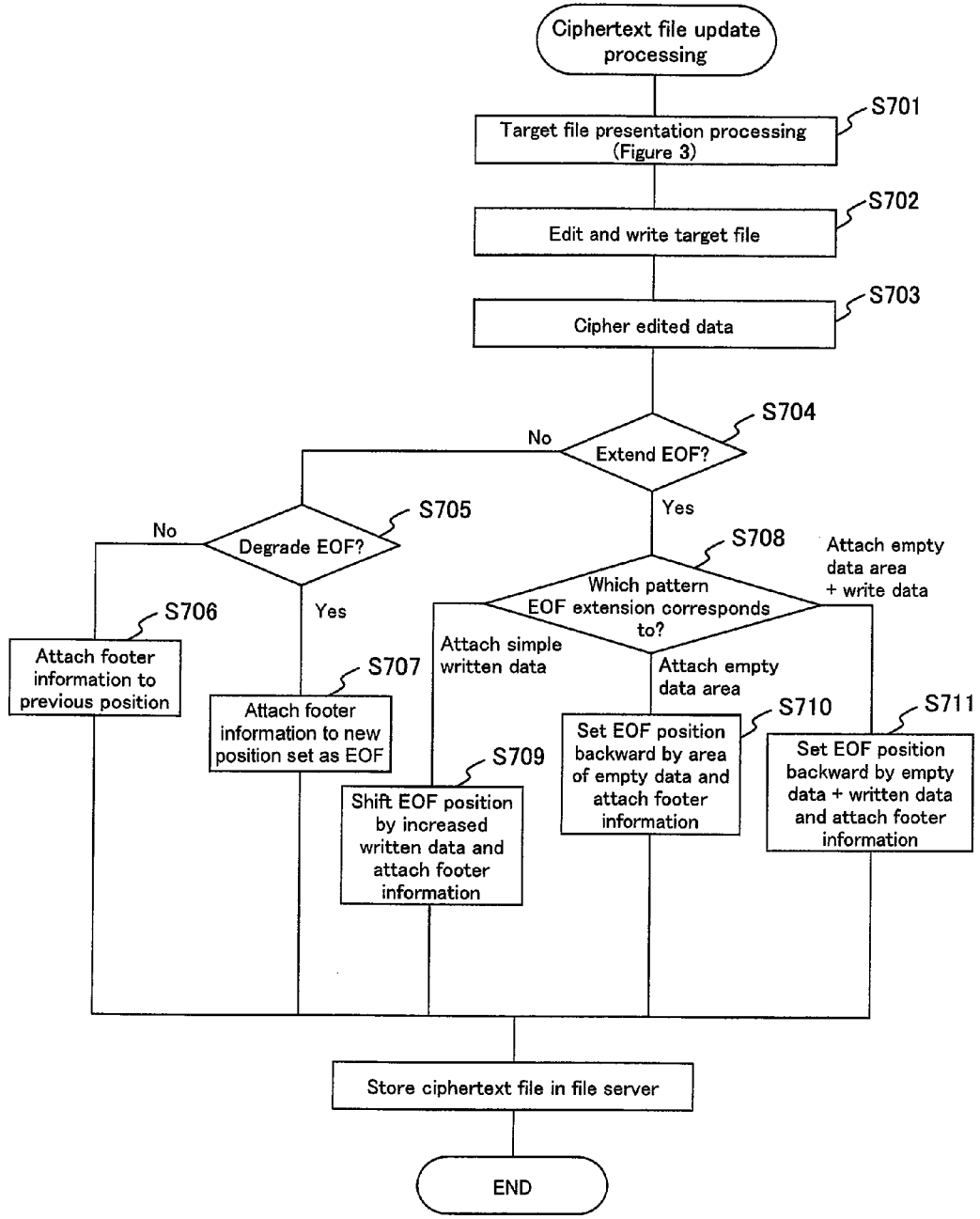
FIG. 7 is a flowchart illustrating file size modification processing.
Figure 8:
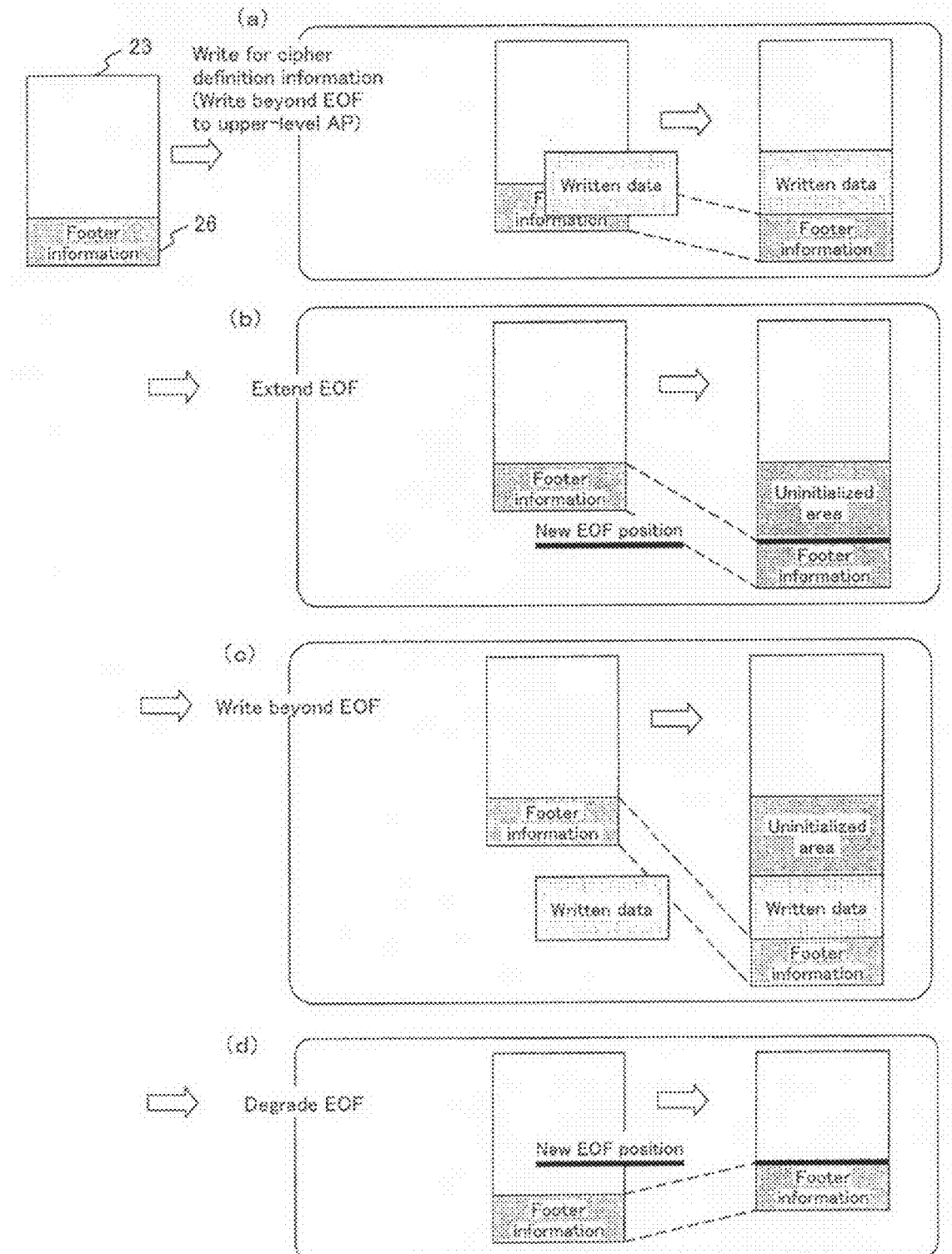
FIG. 8 is a diagram showing a method of maintaining footer information accompanying the file size modification when a ciphertext file is updated.

FIG. 7 is a flowchart illustrating processing to decipher and edit a target ciphertext file, encrypt it again and store it in the file server 2. FIG. 8 is a diagram showing processing to attach footer information if the footer information processing unit 114 of the cipher processing driver 11 modifies a file size when the ciphertext file 23 is updated in a particular example of processing to update a ciphertext file. If a file size is modified, the footer information processing unit 114 disguises a result of adding footer information (the position of a file pointer or the size of written data) such that the upper-level application cannot recognize the result. The following will describe details of the update processing.

Referring to FIG. 7, first, a deciphered target file is delivered to the upper-level application 12 (S701: see FIG. 3 for details). Then, the upper-level application 12 edits the target file (S702). By the editing, the file size increases by writing data or the file size decreases by removing data. Subsequently, the edited file is converted into a ciphertext file by the file ciphering/deciphering unit 113 (S703).

Next, the footer information processing unit 114 judges whether or not the file size increases due to the file edit and the position of the EOF (an apparent EOF to a user) must be extended (S704). If it is judged that the position does not need to be extended, the footer information processing unit 114 further judges whether or not the EOF needs to be degraded due to the file edit (S705). If the EOF does not need to be extended/degraded, the footer information processing unit 114 attaches footer information to the previous position (S706). If the EOF must be degraded, the footer information processing unit 114 sets a new position as the EOF and attaches footer information to the position (S707). FIG. 8(d) shows a case in that a file size increases (degrades), i.e., an update is requested to set a new EOF at a position before the current EOF. In that case, the footer information 26 is written after the new EOF.

If it is judged at step S704 that the EOF must be extended, the footer information processing unit 114 judges which of three patterns, for example, the EOF extension corresponds to (S708): i) the EOF position is modified due to simple data writing, ii) an empty data area is attached, and iii) empty data is attached and data is written.

If it is judged at step S708 to be the pattern i), the footer information processing unit 114 moves the EOF position backward by the size of the written data to attach footer information to cipher data (S709). FIG. 8(a) shows an example in a case that a request is made to write data beyond the current file size, and as a result, the file size expands. In that case, updated written data is added to a cipher data body where the updated written data is added, and then the footer information 26 is written after the updated written data.

If it is judged at step S708 to be the pattern ii), the footer processing unit 114 moves the EOF position backward by the size of the empty data to attach the footer information to the cipher data (S710). FIG. 8(b) shows an example in a case that the file size increases (extends), i.e., no data is written but an update is requested to set a new EOF at a position after the current EOF. In that case, a section from the original EOF position to the new EOF is, for example, an uninitialized area (empty data area) and the footer information 26 is written after the new EOF.

If it is judged at step S708 to be the pattern iii), the footer information processing unit 114 moves the EOF position backward by the size of the empty data and write data to attach the footer information to the cipher data (S711). FIG. 8(c) shows an example in a case that it is requested to start data writing at a position after the current EOF. In that case, a section from the original EOF position to the start position to write data is, for example, an uninitialized area, after which the written data is added, after which the footer information 26 is written.

Finally, the redirector 13 delivers the file attached with the footer information as a ciphertext file to the file server 2 which stores the file.

In the above way, if an update is requested for the ciphertext file 23 to modify the file size, the cipher processing driver 11 moves the position of the footer information 26 as the above. As a result, the ciphertext file 23 can be updated while maintaining the integrity without the upper-level application 12 being conscious of the information.

CONCLUSION

According to this embodiment, if a folder stores both a ciphertext file and a plaintext file, the ciphertext file is attached with identification information (preferably, footer information) indicating that the file is a ciphertext file for file processing. This allows for differentiating a plaintext file and a ciphertext file from each other when a folder is accessed which contains both the ciphertext file and the plaintext file.

A deciphered file gained by removing identification information from a ciphertext file and deciphering the file is delivered to an upper-level application. As such, a file can be accessed while maintaining the file integrity (presenting a deciphered ciphertext file and presenting an unprocessed plaintext file) without a user being conscious of whether or not the file contains a ciphertext.

The identification information is preferably footer information attached after body data in a ciphertext file. It is because if the identification information is in header information or an intermediate part in the file, offset must be always considered to read the body data, making data management more complex than with footer information. The footer information has a merit that data can be managed using a physical address itself without considering offset.

If the request to read a file is a request to read data of a pre-determined size from an intermediate position in a ciphertext file to footer information (see FIG. 6), then an identification information part is embedded with insignificant information (NULL), a read file is deciphered, the insignificant information (NULL) is removed and the file is delivered to said upper-level application program. This can guarantee the file integrity and avoid a risk of leaking important information such as a deciphering key contained in the footer information to the outside.

If a read file is a ciphertext file, authentication processing is executed before deciphering. This allows for deciphering a ciphertext file only if the authentication is successful, further enhancing the security.

The embodiment also considers an attaching position of footer information when a file which has been once read is updated through addition or removal of data. That is, in that case, data in a file edited by an upper-level application program is encrypted and an attaching position of footer information to cipher data is modified according to the increase/decrease in the file size after the edit to generate an updated ciphertext file and write the updated ciphertext file in a folder.

This embodiment has illustrated a case in which a file server stores a ciphertext file and a plaintext file. The present invention is not limited to it, and a memory in a client terminal can also store the files. Although the embodiment includes an authentication server which is accessed for authentication, an authentication program can be installed in the client terminal. Although the embodiment has illustrated a case in which a cipher processing driver is installed in the client terminal, functions of the cipher processing driver can be provided to a server via a network.

The present invention may also be accomplished by a program code of software to realize the functions of the embodiment. In this case, storage media recording the program code is provided to the system or the devices and computers (or CPUs or MPUs) of the system or the devices read out the program code stored in the storage media. In this case, the program code itself read from the storage media realizes the functions of the embodiment described above, and hence the program code and the storage media in which the program code is stored constitute the present invention. Examples of the storage media for supplying the program code include, for example, a floppy (R) disc, a CD-ROM, a DVD-ROM, a hard disk, an optical disc, a magnetic-optical disc, a CD-R, a magnetic tape, a nonvolatile memory card, a ROM and the like.

Further, the functions of the above described embodiments may be accomplished by causing an OS (operating system) or the like which operates on the computer to perform a part or all of the actual operations based on instructions of the program code. Further, the functions of the above described embodiment may be accomplished by writing a program code read out from the storage media into a memory provided on a computer and then causing a CPU or the like provided in the computer to perform a part or all of the actual operations based on instructions of the program code.

Furthermore, a program code of software to realize the functions of the embodiment may be delivered via a network so that it is stored in storage means such as a hard disk or a memory of a system or a device, or storage media such as a CD-RW or a CD-R. A computer (or CPU or MPU) of the system or device can read out and execute the program code stored in the storage means or the storage media so that the functions are accomplished.

The invention claimed is:

1. A file processing system for obtaining a file from a folder storing both a ciphertext file and a plaintext file and for delivering the file to an upper-level application program by using a computer executing the upper-level application program, where said ciphertext file is attached with identification information indicating that the relevant file is a ciphertext file, said file processing system comprising:
    file read/write means for executing read or write of a file from/to said folder if said upper-level application program requests to read said file stored in said folder or requests to write said file;
    file distinguishing means for distinguishing whether said read file is a plaintext file or a ciphertext file based on whether or not said read file contains said identification information; and
    file processing means for deciphering said ciphertext file and delivering a deciphered file produced by excluding said identification information from said read file to said upper-level application program if said read file is a ciphertext file,
    wherein said identification information is footer information attached after body data in said ciphertext file,
    wherein if the request to read said file is a request to read data of a pre-determined size from an intermediate position in said ciphertext file to said footer information, said file processing means embeds insignificant information in a part of said identification information, deciphers said read file, removes said insignificant information and delivers the file to said upper-level application program,
    wherein said file processing means further encrypts data after file edit by said upper-level application program, and modifies an attaching position of said footer information to cipher data, according to an increase/decrease in a file size after the edit and attachment of empty data area, by a size of the increase/decrease in the file size and the attachment of the empty data to generate an updated ciphertext file and disguises a result of the update by attaching the same footer information as the footer information which was attached to the file before the file edit, and
    wherein said file read/write means writes said updated ciphertext file in said folder.

2. The file processing system according to claim 1, wherein said file processing means does not execute decipher processing on said plaintext file but passes said plaintext file to said upper-level application program if said read file is a plaintext file.

3. The file processing system according to claim 1, further comprising authentication means for executing authentication processing before said deciphering if said read file is said ciphertext file, wherein:
    if the authentication is successful, said file processing means deciphers said ciphertext file and delivers the deciphered file to said upper-level application program.

4. A file processing method of obtaining a file from a folder storing both a ciphertext file and a plaintext file and of delivering the file to an upper-level application program by using a computer executing the upper-level application program, where said ciphertext file is attached with identification information indicating that the relevant file is a ciphertext file, said file processing method comprising:
    a file read step by file read/write means of reading, if said upper-level application program requests to read a file stored in said folder, said file from said folder in response to the request;
    a file distinguishing step by file distinguishing means of distinguishing whether said read file is a plaintext file or a ciphertext file based on whether or not said read file contains said identification information; and
    a file processing step by file processing means of deciphering said ciphertext file and delivering a deciphered file produced by excluding said identification information from said read file to said upper-level application program if said read file is a ciphertext file, wherein said identification information is footer information attached after body data in said ciphertext file, wherein if the request to read said file is a request to read data of a pre-determined size from an intermediate position in said ciphertext file to said footer information, then in said file processing step, said file processing means embeds insignificant information in a part of said identification information, deciphers said read file, removes said insignificant information and delivers the file to said upper-level application program, wherein said file processing means further encrypts data after file edit by said upper-level application program, and modifies an attaching position of said footer information to cipher data, according to an increase/decrease in a file size after the edit and attachment of empty data area, by a size of the increase/decrease in the file size and the attachment of the empty data to generate an updated ciphertext file and disguises a result of the update by attaching the same footer information as the footer information which was attached to the file before the file edit, and wherein said file read/write means writes said updated ciphertext file in said folder.

5. The file processing method according to claim 4, wherein in said file processing step, said file processing means does not execute decipher processing on said plaintext file but passes said plaintext file to said upper-level application program if said read file is a plaintext file.

6. The file processing method according to claim 4, further comprising an authentication step by authentication means of executing authentication processing before said deciphering if said read file is said ciphertext file, and wherein in said file processing step, if the authentication is successful, said file processing means deciphers said ciphertext file and delivers the deciphered file to said upper-level application program.

7. A non-transitory computer readable medium with a file processing program stored thereon for obtaining a file from a folder storing both a ciphertext file and a plaintext file and for delivering the file to an upper-level application program, where said ciphertext file is attached with identification information indicating that the relevant file is a ciphertext file, said file processing program comprising:

a step by file read/write means of, if said upper-level application program requests to read a file stored in said folder, reading said file from said folder in response to the request;

a step by file distinguishing means of distinguishing whether said read file is a plaintext file or a ciphertext file based on whether or not said read file contains said identification information; and a step by file processing means of deciphering said ciphertext file and delivering a deciphered file produced by excluding said identification information from said read file to said upper-level application program if said read file is a ciphertext file, wherein said identification information is footer information attached after body data in said ciphertext file, wherein if the request to read said file is a request to read data of a pre-determined size from an intermediate position in said ciphertext file to said footer information, then in said file processing step, said file processing means embeds insignificant information in a part of said identification information, deciphers said read file, removes said insignificant information and delivers the file to said upper-level application program, wherein said file processing means further encrypts data after file edit by said upper-level application program, and modifies an attaching position of said footer information to cipher data, according to an increase/decrease in a file size after the edit and attachment of empty data area, by a size of the increase/decrease in the file size and the attachment of the empty data to generate an updated ciphertext file and disguises a result of the update by attaching the same footer information as the footer information which was attached to the file before the file edit, and wherein said file read/write means writes said updated ciphertext file in said folder.

8. The non-transitory computer readable medium according to claim 7, wherein in said file processing step, said file processing means does not execute decipher processing on said plaintext file but passes said plaintext file to said upper-level application program if said read file is a plaintext file.

9. The non-transitory computer readable medium according to claim 7, further comprising a program code for authentication means to execute an authentication step of executing authentication processing before said deciphering if said read file is said ciphertext file, and wherein in said file processing step, if the authentication is successful, said file processing means deciphers said ciphertext file and delivers the deciphered file to said upper-level application program.

* * * * *